United States Patent
De (10) Patent No.: US 8,046,320 B2
(45) Date of Patent: Oct. 25, 2011

(54) DOMAIN-INDEPENDENT ARCHITECTURE IN A COMMAND AND CONTROL SYSTEM

(75) Inventor: Piali De, Harvard, MA (US)

(73) Assignee: Raytheon Company, Waltham, MA (US)

( * ) Notice: Subject to any disclaimer, the term of this patent is extended or adjusted under 35 U.S.C. 154(b) by 833 days.

(21) Appl. No.: 12/120,280

(22) Filed: May 14, 2008

(65) Prior Publication Data

US 2008/0288434 A1 Nov. 20, 2008

Related U.S. Application Data

(60) Provisional application No. 60/938,481, filed on May 17, 2007.

(51) Int. Cl.
*G06N 5/02* (2006.01)

(52) U.S. Cl. ................ 706/47; 706/60; 706/45

(58) Field of Classification Search .......... 706/47, 706/60; 707/999.003
See application file for complete search history.

(56) References Cited

U.S. PATENT DOCUMENTS

| | | | |
|---|---|---|---|
| 4,584,578 A | 4/1986 | Brauns et al. | |
| 6,122,572 A | 9/2000 | Yavnai | |
| 6,369,705 B1 | 4/2002 | Kennedy | |
| 6,675,159 B1 | 1/2004 | Lin et al. | |
| 6,816,800 B2 | 11/2004 | Heiland | |
| 6,879,257 B2 | 4/2005 | Hisano et al. | |
| 6,975,346 B2 | 12/2005 | Kumhyr | |
| 7,249,117 B2 | 7/2007 | Estes | |
| 7,328,209 B2 | 2/2008 | Das et al. | |
| 7,519,569 B1 * | 4/2009 | Flynn et al. | 706/60 |
| 7,523,137 B2 | 4/2009 | Kass et al. | |
| 2003/0149610 A1 | 8/2003 | Rowan et al. | |
| 2003/0190589 A1 | 10/2003 | Lechner | |
| 2003/0213358 A1 | 11/2003 | Harding | |
| 2004/0015375 A1 | 1/2004 | Cogliandro | |
| 2004/0267395 A1 | 12/2004 | Discenzo et al. | |
| 2005/0004723 A1 | 1/2005 | Duggan et al. | |
| 2005/0197991 A1 | 9/2005 | Wray et al. | |
| 2005/0212523 A1 | 9/2005 | Chang et al. | |

(Continued)

FOREIGN PATENT DOCUMENTS

WO    WO 03/083800 A1    10/2003

OTHER PUBLICATIONS

Notification of Transmittal of the International Search Report and the Written Opinion of the International Searching Authority, or the Declaration, PCT/US2008/063673 dated Dec. 22, 2008.

(Continued)

*Primary Examiner* — Jeffrey A Gaffin
*Assistant Examiner* — Ola Olude-Afolabi
(74) *Attorney, Agent, or Firm* — Daly, Crowley, Mofford & Durkee, LLP (57) ABSTRACT

In one aspect, a command and control (C2) system includes a domain-independent architecture comprising an ontology model. The ontology model includes a resource aspect configured to receive entities specific to a domain, a responsibility aspect configured to receive actions specific to the domain and performed by the entities, a rules aspect configured to receive rules specific to the domain and associated with the actions and a results aspect configured to receive effects specific to the domain and associated with the actions.

21 Claims, 10 Drawing Sheets

U.S. PATENT DOCUMENTS

| | | | |
|---|---|---|---|
| 2006/0020459 | A1 | 1/2006 | Carter et al. |
| 2006/0229921 | A1 | 10/2006 | Colbeck |
| 2006/0229926 | A1 | 10/2006 | Homann et al. |
| 2006/0235707 | A1 | 10/2006 | Goldstein et al. |
| 2006/0282302 | A1 | 12/2006 | Hussain |
| 2007/0074182 | A1 | 3/2007 | Hinchey et al. |
| 2008/0040308 | A1* | 2/2008 | Ranganathan et al. ........... 707/1 |
| 2008/0077598 | A1 | 3/2008 | Wilmering et al. |
| 2008/0091633 | A1 | 4/2008 | Rappaport et al. |
| 2008/0307523 | A1 | 12/2008 | Subramanyam et al. |

OTHER PUBLICATIONS

File downloaded for U.S. Appl. No. 11/392,222, filed Mar. 28, 2006, file through Jan. 9, 2009, 1057 pages.

File downloaded for U.S. Appl. No. 11/265,802, filed Nov. 1, 2005, file through Jan. 9, 2009, 573 pages.

Notification of Transmittal of the International Search Report and the Written Opinion of the International Searching Authority, or the Declaration dated Nov. 25, 2008, PCT/US 07/05741, 8 pages.

Notification of Transmittal of the International Search Report and the Written Opinion of the International Searching Authority, or the Declaration dated Feb. 13, 2007, PCT/US2006 040355, 16 pages.

Lin Zhang, et al., "A Coloured Petri Net based Tool for Course of Action Development and Analysis", ACM International Conference Proceeding Series, XP002417643, vol. 145, 2002, pp. 125-134.

Huel Wan Ang, et al., "Improving the Practice of DoD Architecting with the Architecture Specification Model", XP002417644, [Online] Jun. 2002, The Mitre Corporation, 10 pages, http://www.mitre.org/work/tech_papers/tech_papers_05/05_0423/05_O423.pdf>.

Bondavalli A., et al., "DEEM: A Tool for the Dependability Modeling and Evaluation of Multiple Phased Systems", Proceedings International Conf. on Dependable Systems and Networks, XP000988657, IEEE Comp. Soc, US, Jun. 25, 2000, pp. 231-236.

Wagenhals, L.W., et al., "Creating Executable Models of Influence Nets with Colored Petri Nets", XP002417645, Int'l Journal on Software Tools for Technology Transfer, Springer-Verlag, Germany, vol. 2, No. 2, Dec. 1998, pp. 168-181.

Mura, Ivan, et al., "Hierarchical Modeling & Evaluation of Phased-Mission Systems", XP002417646, IEEE Transactions on Reliability, 1999, vol. 48, No. 4, pp. 360-368.

Kristensen, et al. "Application of Coloured Petri Nets in System Development", XP019007958, vol. 3098, 2004, pp. 626-685.

Piali De, et al., "Design and Analysis of Integrated Fires in a Future Mission", Briefing to National Fire Control Symposium, Orlando, Florida, Jul. 25-28, 2005, 21 pages.

International Preliminary Report on Patentability (Form PCT/IB/373) and Written Opinion (Form PCT/ISA/237) for PCT/US2006/040355, dated May 15, 2008, 10 pages.

David Wallace, "Language use in a branching Universe", Balliol College, Oxford, U.K., Dec. 2005, 21 pages.

Kuter, et al., "Interactive Planning under Uncertainty with Causal Modeling and Analysis", Univ. of Maryland, Dept. of Computer Science; Rome Laboratory, 2003, 8 pages.

Amant et al., "Data Analysis Assistance for Interactive Planning", North Carolina State University, Dept. of Computer Science, 2000, 8 pages.

Lumbo, Master of Science in Organizational Dynamics Theses, Applications of Interactive Planning Methodology, Submitted to the Program of Organizational Dynamics, Univ. of Pennsylvania, 2007, 72 pages.

Ambite, et al., "Getting from Here to There: Interactive Planning and Agent Execution for Optimizing Travel", 2002, 8 pages.

Kuter, et al., "Interactive Course-of-Action Planning Using Causal Models", Proceedings of the Third Int'l Conf. on Knowledge Systems for Coalition Operations (KSCO-2004), Oct. 2004 (postponed), 12 pages.

Gary Borchardt, "Interactive Planning and Monitoring" Artificial Intelligence Laboratory, Mass Inst. of Tech., http://www.ai.mit.edu, 2000, pp. 205-206.

Perini et al., "An Interactive Planning Architecture, The Forest Fire Fighting case", I.R.S.T., povo, Italy, 1996, 11 pages.

Kim, et al., "A Planner Independent Approach to Human Interactive Planning", Univ. of So. California and Inst. For Creative Technologies, Aug. 9, 2003, 18 pages.

Weir, "Learning From a Plan-Based Interface", Comput. Educ., vol. 12, No. 1, pp. 247-251, 1988.

Ferguson et al., "TRIPS: An Integrated Intelligent Problem-Solving Assistant", Univ. of Rochester, Dept. of Computer Science, 1998, American Assoc. for Artificial Inteligence (www.aaai.org), 6 pages.

Anderson, et al., "An Integrated Theory of the Mind", Psychological Review, 2004, vol. 111, No. 4, pp. 1036-1060.

ACT-R, "About ACT-R", http://act-r.psv.cmu.edu/about/, Dept. of Psychology, Carnegie Mellon Univ., webmaster@act-r.psy.cmu.ed, printout dated Oct. 31, 2008, 4 pages.

Horling, et al. "The Taems White Paper", Univ. of Mass., Amherst, MA, 2005, 6 pages.

Notification Concerning Transmittal of International Preliminary Report on Patentability (Chapter 1 of the Patent Cooperation Treaty); PCT/US2007/005741 dated Jan. 22, 2009.

Perini et al., "An Interactive Planning Architecture, The Forest Fire Fighting case", I.R.S.T., Povo, Italy, 1995, 11 pages.

Horling, et al. "The Taems White Paper", Univ. of Mass., Amherst, MA, 1999, 6 pages.

PCT Search Report of the ISA dated Oct. 1, 2010 for PCT/US2010/044655 filed on Aug. 6, 2010; 5 sheets.

PCT Written Opinion of the ISA dated Oct. 1, 2010 for PCT/US2010/044655 filed on Aug. 6, 2010; 4 sheets.

Adam, et al.; ABSTRACT; "Agency interoperation for effective data mining in border control and homeland security applications;" ACM International Conference Proceeding Series; vol. 262; May 2004; 1 page.

Gates et al.; "CI-Miner Support for Border Security;" Presented at Conference on Border Security, El Paso, Texas, Aug. 2000; 1 page.

Shankar; "A trustworthy partner;" Standard Chartered, Sustainability Review; Jan. 2007; pp. 1-3.

Simmonds; ABSTRACT "Users fight back by breaking the boundaries;" Network Security; vol. 2005, Issue 6, Jun. 2005; 1 page.

List of Publications; Center for Information Management, Integration and Connectivity; Secure Agency Interoperation for Effective Data Mining in Border Control and Homeland Security Applications; Center for Information Management; downloaded Dec. 11, 2007; pp. 1-3.

Harding; "The "Semantic DNS;"" The Open Group 2005; Dec. 11, 2007; pp. 1-74.

Drummond, et al.; Managing Security the Intelligent Way: Moving from Spreadsheets to a Knowledge Base; University of California, Irvine; Security Professionals Conference; Apr. 12, 2004; Part 1 of 4; 10 pages.

Drummond, et al.; Managing Security the Intelligent Way: Moving from Spreadsheets to a Knowledge Base; University of California, Irvine; Security Professionals Conference; Apr. 12, 2004; Part 2 of 4; 10 pages.

Drummond, et al.; Managing Security the Intelligent Way: Moving from Spreadsheets to a Knowledge Base; University of California, Irvine; Security Professionals Conference; Apr. 12, 2004; Part 3 of 4; 10 pages.

Drummond, et al.; Managing Security the Intelligent Way: Moving from Spreadsheets to a Knowledge Base; University of California, Irvine; Security Professionals Conference; Apr. 12, 2004; Part 4 of 4; 11 pages.

File downloaded for U.S. Appl. No. 12/851,622, filed Aug. 6, 2010, file through Nov. 19, 2010, 84 pages.

International Preliminary Report on Patentability (Form PCT/IB/373) and Written Opinion of the International Searching Authority (Form PCT/ISA/237) for PCT/US2008/063673, dated Nov. 17, 2009, 5 pages.

* cited by examiner

DOMAIN-INDEPENDENT ARCHITECTURE IN A COMMAND AND CONTROL SYSTEM

RELATED APPLICATIONS

This patent application claims priority to Application Ser. No. 60/938,481, filed May 17, 2007 entitled "DOMAIN INDEPENDENT ARCHITECTURE FOR SITUATIONAL UNDERSTANDING" which is incorporated herein in its entirety.

BACKGROUND

Command and control (C2) relates to decision-making and the individuals who make decisions. C2 is an ability to recognize what needs to be done in a situation and ensures that effective actions are taken to achieve objectives. In one example, in the military environment, a commander is responsible for C2.

Ontology is a formal explicit specification of concepts in a domain and a relationship among the concepts. For example, the ontology of a domain for a pizza would include concepts of the pizza, a pizza base, and a pizza topping. Subconcepts of the pizza base include deep pan base and thin and crispy base. Subconcepts of the pizza topping include a cheese topping, a vegetable topping and a meat topping. A relationship among the concepts includes, for example, that all pizza has one pizza base and one or more pizza topping.

SUMMARY

In one aspect, a command and control (C2) system includes a domain-independent architecture comprising an ontology model. The ontology model includes a resource aspect configured to receive entities specific to a domain, a responsibility aspect configured to receive actions specific to the domain and performed by the entities, a rules aspect configured to receive rules specific to the domain and associated with the actions and a results aspect configured to receive effects specific to the domain and associated with the actions.

In another aspect, a command and control (C2) system includes a domain-independent architecture that includes an ontology model. The ontology model includes a resource aspect configured to receive entities specific to a domain, a responsibility aspect configured to receive actions specific to the domain and performed by the entities, a rule aspect configured to receive rules specific to the domain and associated with the actions and a result aspect configured to receive effects specific to the domain and associated with the actions. Each of the aspects includes at least four levels of abstraction to form at least sixteen concepts and each of the at least four levels of abstraction includes a number of concepts corresponding to a number of aspects. Each of the concepts comprises at least one relationship with another concept. The at least one relationship with another concept includes at least one relationship with another concept in the same level of abstraction and at least one relationship with at least one concept in the same aspect.

In a further aspect, a method of forming a command and control (C2) system includes providing a domain-independent architecture comprising an ontology model including providing a resource aspect configured to receive entities specific to a domain, providing a responsibility aspect configured to receive actions specific to the domain and performed by the entities, providing a rule aspect configured to receive rules specific to the domain and associated with the actions and providing a result aspect configured to receive effects specific to the domain and associated with the actions. Each of the aspects includes at least four levels of abstraction to form at least sixteen concepts and each of the at least four levels of abstraction comprises a number of concepts corresponding to a number of aspects. Each of the concepts comprises at least one relationship with another concept includes at least one relationship with another concept in the same level of abstraction and at least one relationship with at least one concept in the same aspect.

DETAILED DESCRIPTION

Complex missions involving many geographically dispersed people and systems challenge human ability to keep track of what is happening. At times, the amount of data is overwhelming, making it difficult to focus and act on the important pieces of information. Also, the information can be incomplete or ambiguous, thus making decisions even more difficult. Given enough time and opportunity to assimilate information, people are uniquely adapted to understanding situations and to make necessary decisions. However, when adequate time or manpower is unavailable, loosely coupled actors can quickly become unsynchronized, leading to mission failure.

As used herein a mission may apply to a number of scenarios. In one example, a mission may apply to a military scenario. In another example, the mission may apply to natural disasters such as preparation and relief. In another example, the mission may apply to operations of a company.

As used herein raw data is defined as what is observed (e.g., detected, sensed and so forth). Resource data (information) is defined as what is processed (i.e., derived from the observations). Knowledge data is defined as how what is observed and derived from observations is contextualized (i.e., explained).

Described herein is a domain-independent command and control (C2) architecture that may be used in any type of domain environment to accomplish a mission. The C2 architecture may be applied to include all command and control problems, customized through an ontology model. The form of the ontology model can represent a complete set of knowledge necessary to support C2. By using the ontology model, knowledge about the mission is dynamically built and reasoned about. The dynamic reasoning leads to just-in-time, contextually relevant and individualized decision support for C2. The domain-independent C2 architecture represents knowledge for sharing and collaboration, which can improve both individual and shared awareness and improve decision-making, thereby leading to mission effectiveness and agility.

By populating the domain-independent C2 knowledge framework with specific instances of knowledge from a desired domain, the domain-independent architecture can be tailored to accomplish C2 functionality for that domain. Thus, any domain can use the domain-independent C2 architecture domain to support C2. For example, the domain-independent C2 architecture may be used in military operations, law enforcement operations, disaster relief operations and so forth.

The domain-independent C2 architecture includes domain-independent reasoning engines that automatically and constantly organize and relate information, interpret its implication to command and control and, based on the interpretation, provide role-customized decision support. The domain-independent C2 architecture provides dynamic information flow management so that the right information is available to the right person at the right time, real-time synchronization of independent, asynchronous actors so that everyone works together towards the same goals and objectives and provides a common assessment of events so that all decisions are based on a shared understanding of the situation.

The domain-independent C2 architecture allows for missions on a large scale and scope to be performed by assisting in organizing and relating information, tracking what has happened, anticipating future actions and providing just-in-time support so that that necessary decision-making can be made. Such systems would accept input from sensors, understand the value of the data; integrate the data with data from other sensors if necessary and forward the composite information to those who need it. Likewise, the system would accept input from people, understand the relevance of the input, integrate with the input from others if necessary and share the composite information with those who need it. The system can further prompt people and systems into actions that are required by the situation.

Figure 1:
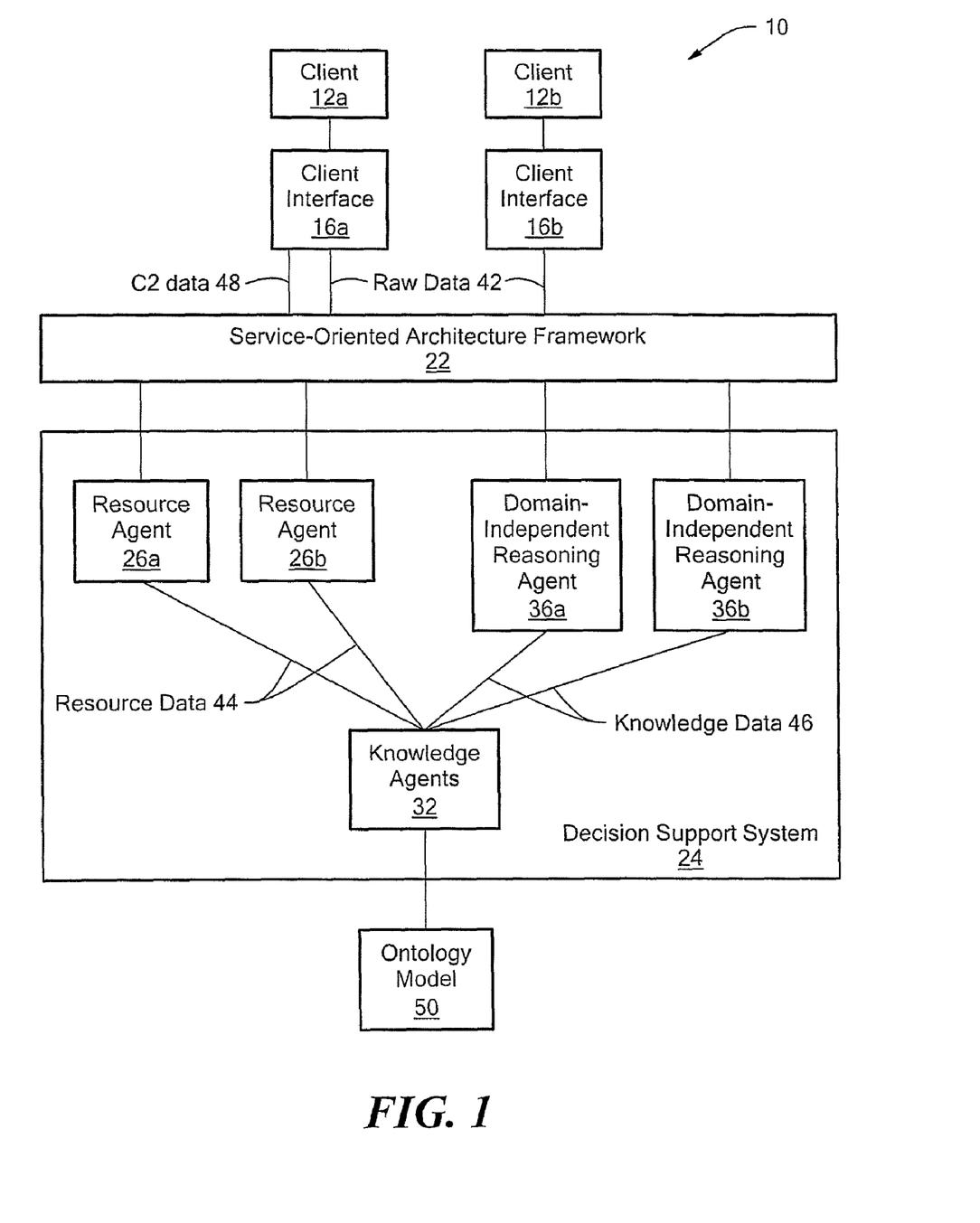
FIG. 1 is a command and control (C2) system including a domain-independent architecture.

Referring to FIG. 1, a command and control system 10 includes clients (e.g., a client 12a and a client 12b), client interfaces (a client interface 16a and a client interface 16b), a service oriented architecture framework 22, a decision support system 24 and an ontology model 50. The decision support system 24 includes resource agents (e.g., a resource agent 26a and a resource agent 26b), knowledge agents 32 that use the ontology model 50 and domain-independent reasoning agents (e.g., a domain-independent reasoning agent 36a and a domain-independent reasoning agent 36b). In one example, system 10 is a net-centric solution that combines information received from multiple sources to continuously generate situational knowledge of who is where, doing what, how, why and what might happen next. Based on the situational knowledge, the system 10 provides just-in-time, role-customized information and advice to the clients 12a, 12b.

The clients 12a, 12b may include systems and people that gather data and/or consume data. For example, the clients 12a, 12b may be a sensor such as a radar, a satellite, a radiation detector and so forth. In another example, the clients 12a, 12b may be a person entering data or a system that provides data. In other examples, the clients 12a, 12b may be persons or systems that use the data. The clients 12a, 12b may be a decision-maker. For example, a client 12a may receive C2 data 48.

The client interfaces 16a, 16b are automatically customized by the client's role and current situation based on the specific domain. In one example, the client interfaces 16a, 16b include a web-based client interface, which is dynamically composed and includes multiple ways to render information (e.g., rendering information as maps, charts, tables, graphs, texts and so forth). Each rendering depicts consistent information, because each rendering is derived from a common repository of situational knowledge. The client interfaces 16a, 16b provide raw data 42 to the service-oriented architecture framework 22.

The service-oriented architecture framework 22 includes, for example, an enterprise bus for exchanging information and databases to collect information and store synthesized knowledge. In one example, the service oriented architecture framework 22 includes a Java 2 Platform, Enterprise Edition (J2EE) framework, which is suitable for near real-time services. In one example, data models are implemented in the framework 22 to capture mission scale data. The data models may include data models to describe sensor data, geo-physical data, weather data, material request, material availability and logistics, weapons control, resource availability, movement, relationships among mission entities and so forth. In other examples, adapters are implemented in the framework 22 to integrate data in existing databases such as, for example, the Global Information Grid (GIG), intelligence databases through the Distributed Common Ground System (DCGS) Integration Backbone (DIB) manufactured by Raytheon Company of Waltham, Mass., logistics databases, transportation databases and so forth.

The resource agents 26a, 26b are implemented, for example, one per client 12a, 12b (e.g., client 12a is associated with resource agent 26a and client 12b is associated with resource 26b). The resource agents 26a, 26b interpret raw data 42 received from its associated client 12a, 12b; and customize knowledge and presentation to meet requirements of the clients 12a, 12b. In one example, the resource agents 26a, 26b dynamically compose text and graphical outputs for its associated client 12a, 12b based on situational knowledge. In one example, the resource agents 26a, 26b customize human-computer interaction to enhance cognition. In one example, the resource agents 26a, 26b process the raw data 42 to form resource data 44.

The knowledge agents 32 receive the resource data 44 from the resource agents 26a, 26b and generate a common knowledge of who is doing what, why, how and what happens next. The knowledge agents 32 use the domain knowledge in the ontology model 50 to interpret inputs of the clients 12a, 12b and infer who is doing what and why. For example, the knowledge agents 32 link pieces of information per the ontology model 50 and further links the pieces to possible predicted future outcomes to relate past events to anticipated ones.

The knowledge agents 32 interpret the data received and relate it to events defined in the ontology model 50 to form knowledge data 42. As conditions for an event unfold (as defined in the ontology model 50), the knowledge agents 32 infer that an event has happened and identify events that are stated in the ontology model 50 as likely to follow and seek data indicating the anticipated events. For example, the ontology model 50 maps events to observations/indications of the event and to actors who perform the observations. Situational knowledge is formed from a process of seeking data, associating the data with events, reporting events in progress or complete and identifying future events.

The domain-independent reasoning agents 36a, 36b use the knowledge data 42 (e.g., situational knowledge) generated by the knowledge agents 32 to apply algorithms to answer specific questions such as, for example, "what are recommended course of actions," "who should receive this information" and so forth. The results of the analysis by the reasoning agents 36a, 36b is provided to the clients 12a, 12b as a decision-maker or may be used for autonomous actions. In one example, the reasoning agents 32 provide role customized decision support for JDL fusion levels 2 to 5.

In one example, the domain-independent reasoning agents 36a, 36b constantly monitor the situational knowledge (e.g., knowledge data 42) and seek information (e.g., resource data 44 from resource agents 26a, 26b) required to conduct their respective portion of reasoning, which involves, for example, combining associated information to derive additional information. The additional information is reported back to the knowledge agents 32. In one example, if the new information is part of a decision support capability, then the domain-independent reasoning agent 36a or 36b also reports it to the corresponding domain-independent resource agent 26a or 26b.

The domain-independent reasoning agents 36a, 36b perform reasoning that is required in situations that may occur in the mission. Examples of functions performed by the domain-independent reasoning agents 36a, 36b include correlating information to identify the occurrence of a certain event, correlating a collection of events to anticipate a likely situation, inferring cause and effects, maintaining a history of past events, anticipating likely events in the near future, forecasting workflow and information flow, determining location, status and identity of systems and people, forecasting the intent of an enemy or a threat, forecasting risk, determining the alignment between the actors and the commander's intent, identifying viable strategy, identifying course correction, planning execution and tasking resources. For example, the reasoning agents 36a, 36b use fundamental, domain-independent relationships in the ontology model 50 between actors, activities and results to make inferences. In one example, all the domain knowledge necessary to perform the reasoning is contained in the ontology model 50.

In one example, system 10 provides automatic cataloging of data, establishing relationship among data, and fitting data to a common context and identifying data needed to disambiguate context.

In one example, system 10 provides just-in-time, individualized and context relevant decision support, which saves time. System 10 also provides prompting for action, packaging of relevant information, suggested collaborations, automating information flow and automating workflow.

Figure 2:
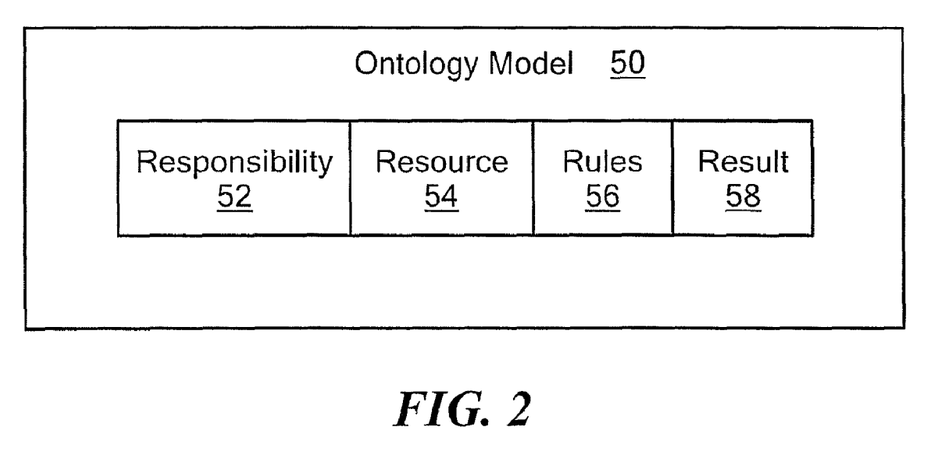
FIG. 2 is a block diagram of an example of an ontology model including four aspects.

Referring to FIG. 2, the ontology model 50 includes a responsibility aspect 52, a resource aspect 54, a rule aspect 56 and a result aspect 58. The four aspects 52-58 align diverse data so that information can be synthesized, aligns people with the information so that knowledge can be synthesized and represents knowledge so that actionable understanding happens. The ontology model is stored, for example, on a storage medium. In one example, the ontology model 50 may be represented in the Web Ontology Language (OWL). In one example, the ontology model 50 is a database structure.

The aspects 52-58 form the cohesion for generating actionable understanding. The resource aspect 54 includes entities that perform actions (e.g., "who is responsible?"). The responsibility aspect 52 includes the actions performed by the entities (e.g., "what actions happen?"). The rule aspect 56 identifies constraints on the actions (e.g., "what rules govern the action?"). The result aspect 58 includes a state change associated with the actions being performed (e.g., "what is the result of the action?").

The ontology model 50 provides logical relationships among the aspects 52-58. At run-time, real-time information are linked to each other per the relationships in the ontology model 50 to build real-time situational knowledge, which in turn trigger software agents to prompt actions, customize data packages and provide situation specific decision support.

Figure 3:
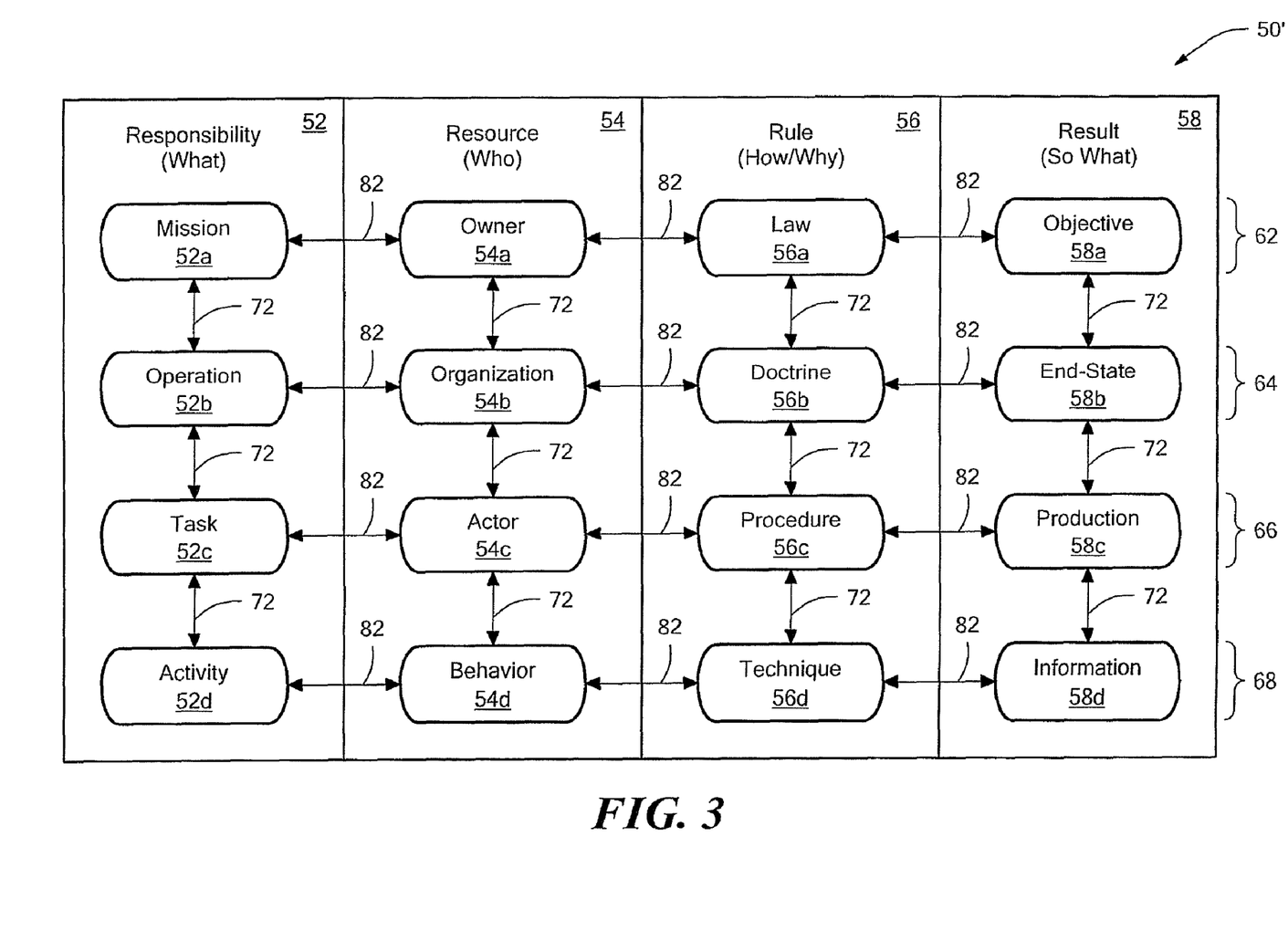
FIG. 3 is a block diagram of an example of an ontology model including four levels of abstraction.

Referring to FIG. 3, the aspects 52-58 are further classified into at least four levels of abstractions (or perspectives) to capture and relate concepts all the way from mission level perspectives to activities of individual actors to form sixteen concepts, four concepts for each aspect 52-58. In other examples of the ontology model 50', the sixteen concepts may be further sub-divided as necessary to specify other relationships concepts at finer levels of abstraction.

For example, at a first level of abstraction 62, the responsibility aspect 52 includes a mission concept 52a associated with one or more missions, the resources aspect 54 includes an owner concept 54a associated with one or more owners, the rule aspect 56 includes a law concept 56a associated with one or more laws and the result aspect 58 includes an objective aspect 58a associated with one or more objectives.

At a second level of abstraction 64, the responsibility aspect 52 includes an operation concept 52b associated with one or more operations, the resource aspect 54 includes an organization concept 54b associated with one or more organizations, the rule aspect 56 includes a doctrine concept 56c associated with one or more doctrines and the result aspect 58 includes an end-state concept 58d associated with one or more end-states.

At a third level of abstraction 66, the responsibility aspect 52 includes a task concept 52c associated with one or more tasks, the resource aspect 54 includes an actor concept 54c associated with one or more actors, the rule aspect 56 includes a procedure concept 56c associated with one or more procedures and the result aspect 58 includes a production concept 58c associated with one or more productions.

At a fourth level of abstraction 68, the responsibility aspect 52 includes an activity concept 52d associated with one or more activities, the resource aspect 54 includes a behavior concept 54d associated with one or more behaviors, the rule aspect 56 includes a technique concept 56d associated with one or more techniques and the result aspect 58 includes an information concept 58d associated with one or more bits of information. In other examples, other levels of abstraction can be added in a symmetric fashion as needed.

Each level of abstraction 62-68 provides a greater level of granularity so that the level of granularity of the fourth level 68 is higher than the other levels 62-66. For example, with respect to the concepts 52a-52d, a mission includes operations, which includes tasks, which includes activities.

There are two kinds of relationships between the concepts: vertical relationships 72 and horizontal relationships 82. Vertical relationships 72 are relationships between concepts from two adjacent levels of abstraction within a single aspect. For example, the mission concept 52a and the operation concept 52b form a vertical relationship 72 and the task concept 52c and the activity concept 52d form a vertical relationship.

In vertical relationships 72 a higher level of abstraction concept includes the concepts in the next lower level of abstraction immediately below and visa versa. For example, the mission concept 52a includes the operation concepts 52b and the operation concept 52b is included in the mission concept 52a. The vertical relationships 72 are also transitive. For example, if a concept A includes a concept B and concept B includes a concept C, then concept A also includes concept C. Thus, the vertical relationships 72 may be nested at various levels of abstraction within each other.

Horizontal relationships 82 are relationships between concepts of different aspects within a single level of abstraction. For example, the mission concept 52a, the owner concept 54a, the law concept 56a and the objective concept 58a have a horizontal relationship 82 with each other.

Referring to FIGS. 4A to 4D, the horizontal relationships 82 relate aspects 52-58 but within a single level of abstraction 62-68. The horizontal relationships 82 pair-wise relate aspects 52-58 and are also symmetrical. In the example shown in FIGS. 4A to 4D there are twelve example horizontal relationships 102-124. Each level of abstraction defines the twelve fundamental relationships among its four aspect concepts.

Figure 4A:
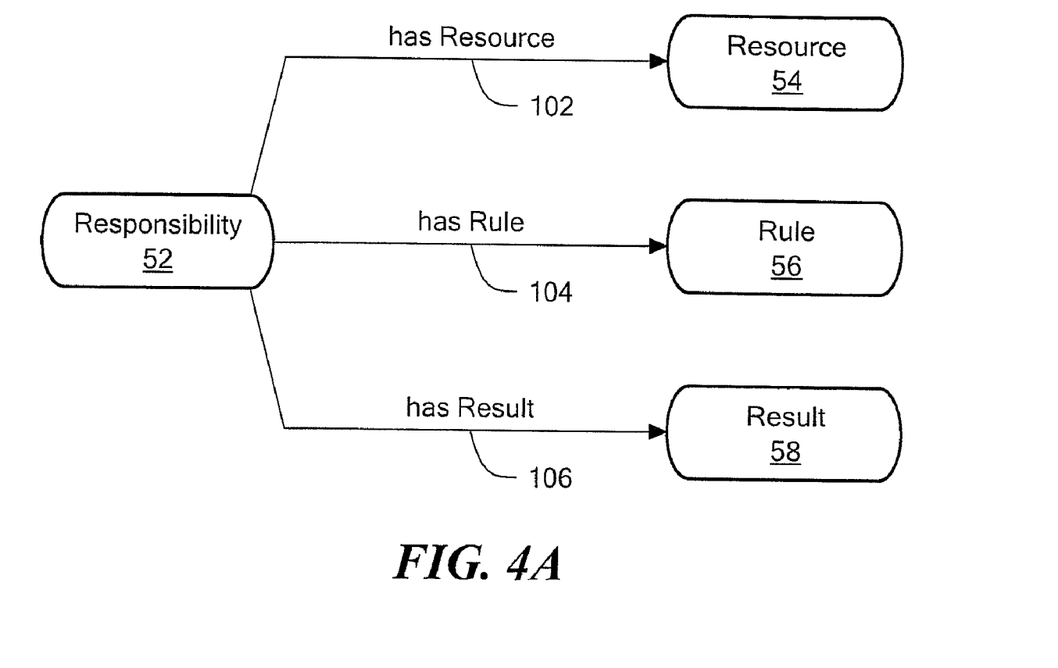
FIGS. 4A to 4D are horizontal relationship diagrams between aspects.
Figure 4B:
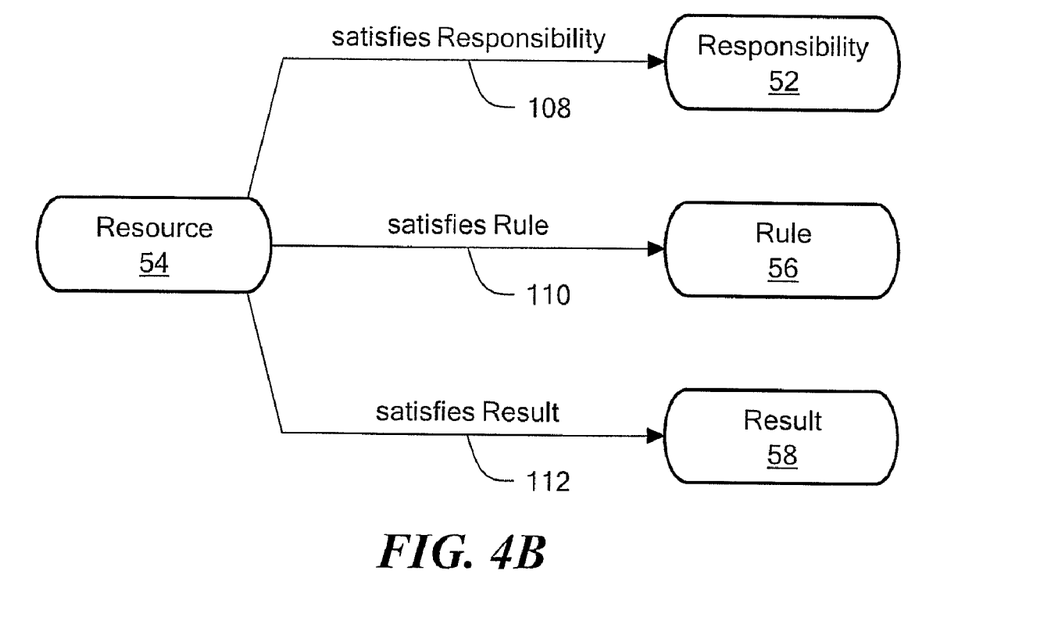
Figure 4C:
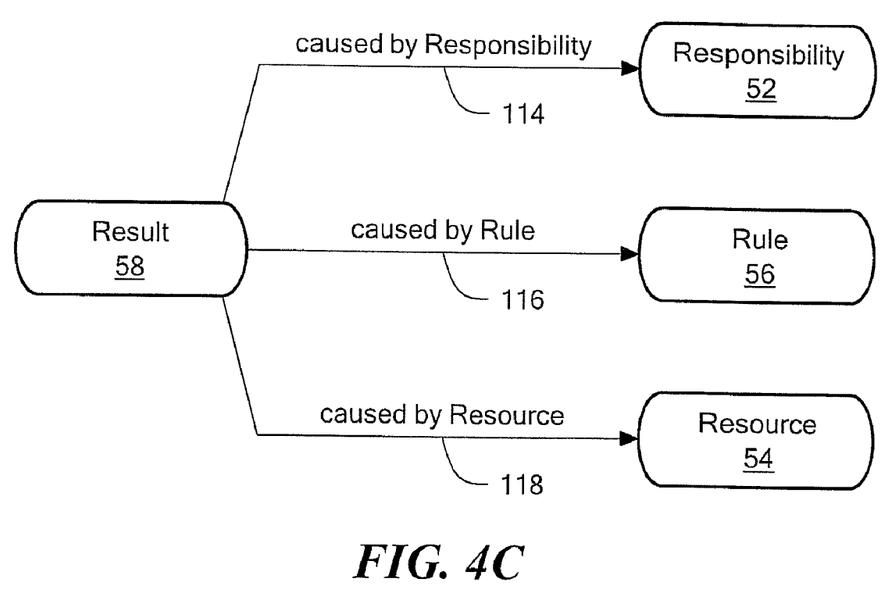
Figure 4D:
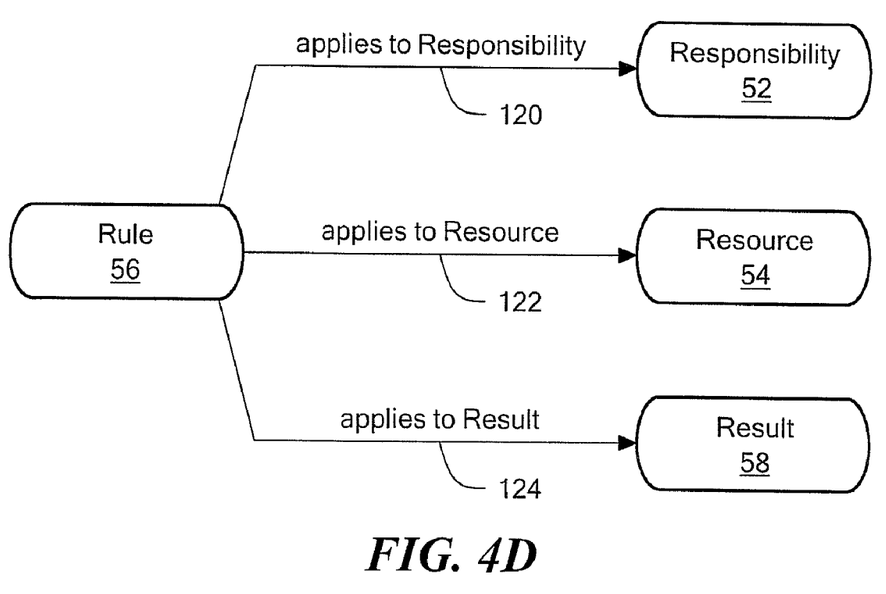

For example, with respect to the responsibility aspect 52, there is a relationship 102 between the responsibility aspect and the resource aspect 54 by a property "has resource," there is a relationship 104 between the responsibility aspect and the rule aspect 56 by a property "has rule" and there is a relationship 104 between the responsibility aspect and the results aspect 56 by a property "has result" (FIG. 4A). With respect to the resource aspect 54, there is a relationship 108 between the resource aspect and the responsibility aspect 52 by a property "satisfies responsibility," there is a relationship 110 between the resource aspect and the rule aspect 56 by a property "satisfies rule" and there is a relationship 112 between the responsibility aspect and the results aspect 56 by a property "satisfies result" (FIG. 4B). With respect to the result aspect 58, there is a relationship 114 between the result aspect and the responsibility aspect 52 by a property "caused by responsibility," there is a relationship 116 between the result aspect and the rule aspect 56 by a property "caused by rule" and there is a relationship 118 between the result aspect and the resource aspect 54 by a property "caused by resource" (FIG. 4C). With respect to the rule aspect 56, there is a relationship 120 between the rule aspect and the responsibility aspect 52 by a property "applies to responsibility," there is a relationship 122 between the rule aspect and the resource aspect 58 by a property "applies to resource" and there is a relationship 124 between the rule aspect and the results aspect 56 by a property "applies to result" (FIG. 4D).

The twelve fundamental horizontal relationships 102-124 include six independent relationships, each independent relationship having a direct relationship and a reciprocal relationship. For example, the relationship 102 is reciprocal to the relationship 108, the relationship 104 is reciprocal to the relationship 120, the relationship 106 is reciprocal to the relationship 114, the relationship 108 is reciprocal to the relationship 122, the relationship 112 is reciprocal to the relationship 118 and the relationship 116 is reciprocal to the relationship 124.

In other examples, there may be additional or other horizontal relationships 82 within the aspects at a same level of abstraction. For example, an actor concept 54c may be related to another actor concept by a property, "has Partner". In another example, the result concept 58 is related to the responsibility aspect 52 by a pair of reciprocal relationships having one property per pair, for example, a "triggers responsibility" property and a "triggered by responsibility" property to denote chain reactions.

The collection of vertical relationships 72 and horizontal relationships 82 provide a complete connection between any of the concepts (e.g., the concepts 52a-52d, 54a-54d, 56a-56d, 58a-58d (in FIG. 3)) in the domain-independent C2 ontology. The complete connection allows the knowledge agents 32 to continually generate situational knowledge (knowledge data 42) and the reasoning agents 36a, 36b to provide context-relevant decision support.

System 10 is a knowledge-based fusion system where patterns of behaviors for actors in a mission are stored in the ontology model 50'. In the ontology model 50', actions are related to those that precede it and those that follow. Each action is also described in terms of the data that it requires and the data that it produces. Actions are paired with actors and consequences. Simple atomic concepts relate actions to actors and actors to consequences. Many atomic relationships together describe a mission. In one example, the data for the ontology model is derived from various operational and systems views in the Department of Defense Architecture Framework (DoDAF), for example. Based on the ontology model 50', the knowledge agents 32 combine and recombine resource data 44 to generate knowledge data 42, to answer C2 related questions, and to prompt for action in real-time.

In one example, the relationships include the following: an activity belongs to a task, a behavior causes an activity, a behavior follows a technique, an activity generates an interaction, an owner has a mission and a law governs execution of the mission.

Figure 5:
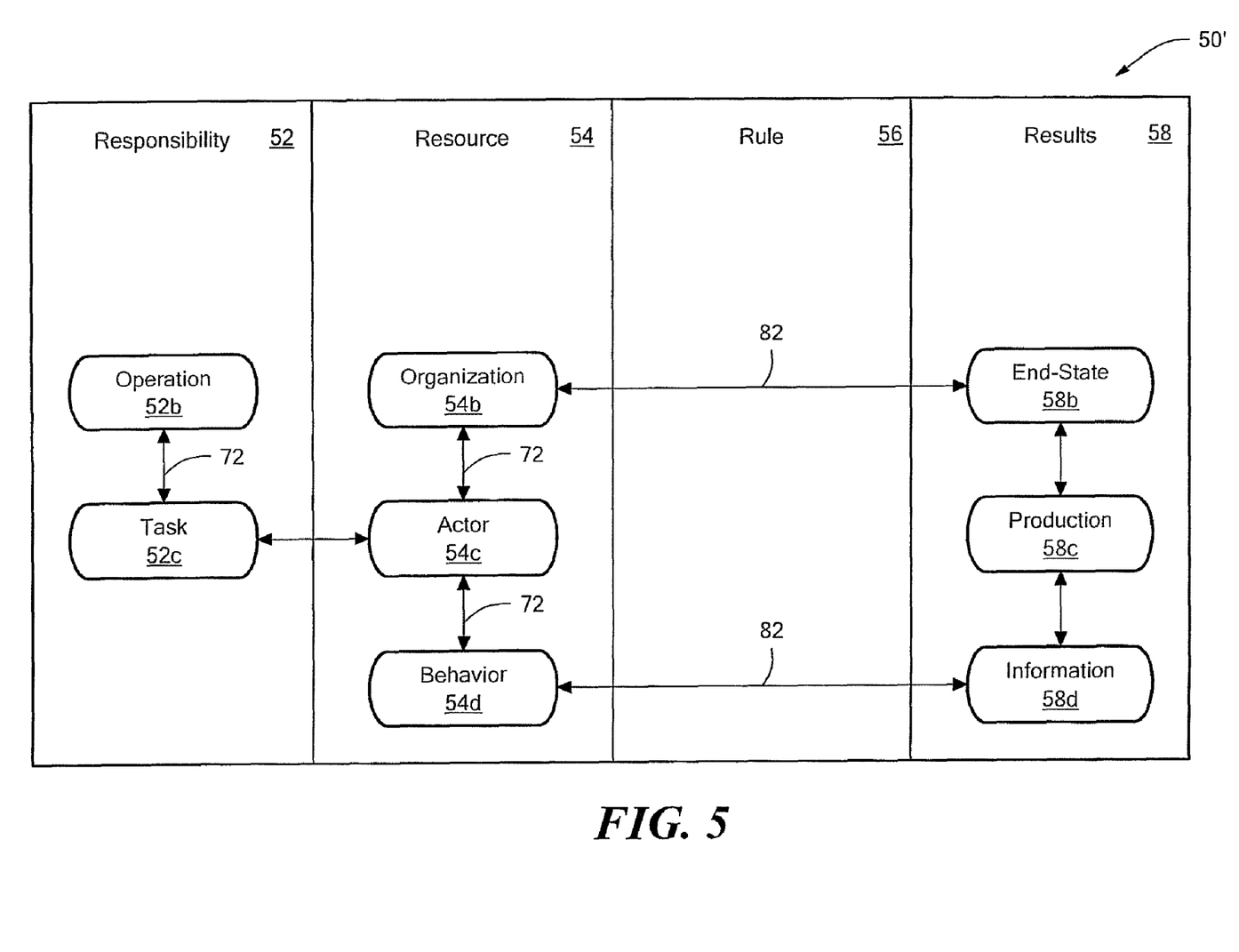
FIG. 5 is a block diagram depicting example relationships amongst the concepts in the ontology model.

FIG. 5 is an example of the relationships 72, 82 used by one or more of the domain-independent reasoning agents 36a, 36b to form a situational understanding. For example, by using the horizontal relationships 82 and the vertical relationships 72, the domain-independent reasoning agents 36a, 36b infer operational progress using the operation concept 52b, infer a task being performed from the task concept 52c, infer an actor using the actor concept 54c, infer the data that is produced from the production concept 58c, and identify the actors who produce the information, desired end states and the production needed. The inferences are spontaneously and continuously made in no prescribed order.

Figure 6:
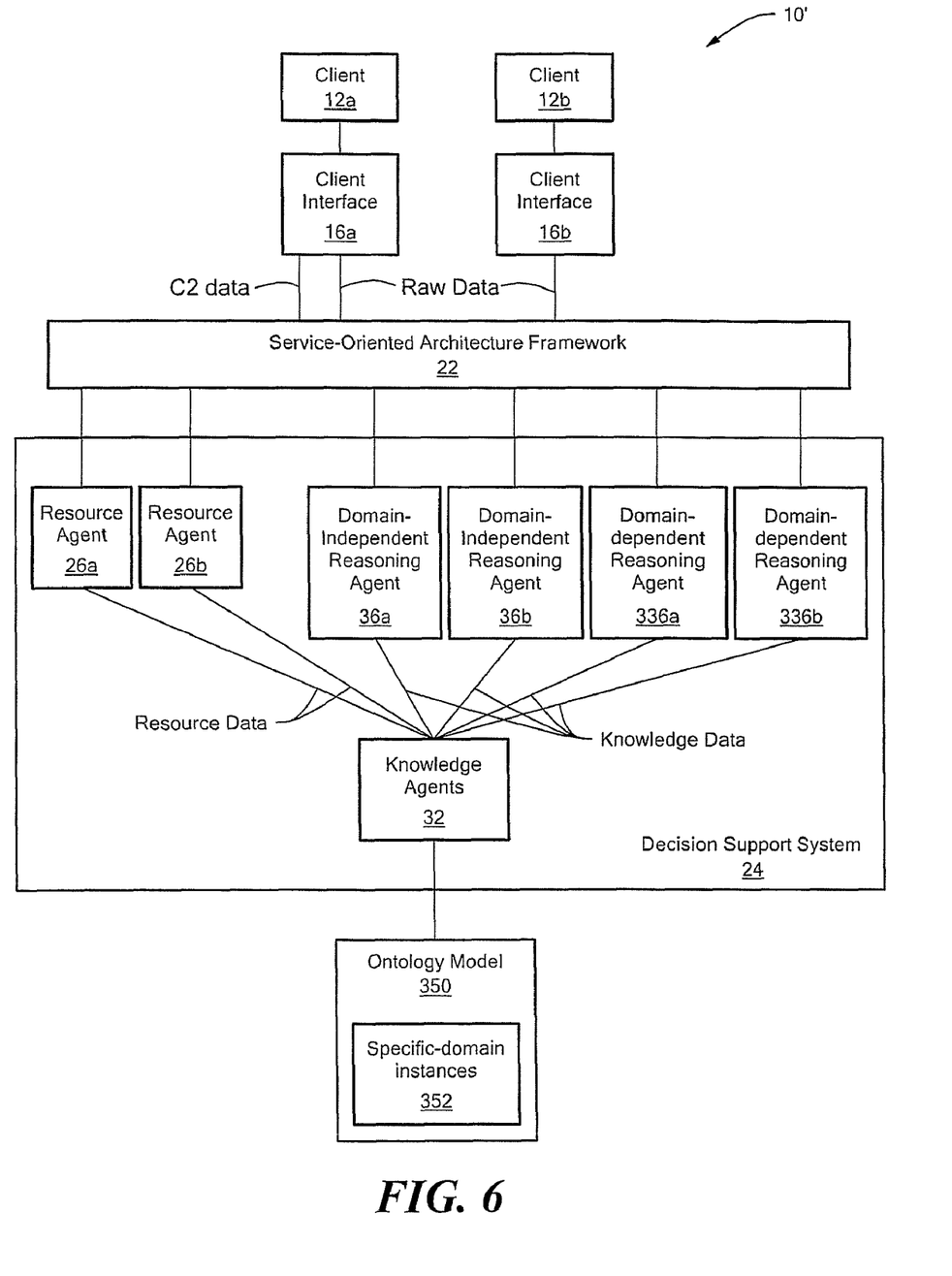
FIG. 6 is a command and control (C2) system of FIG. 1 tailored to a domain-specific environment.

Referring to FIG. 6, a C2 system 10' for a specific domain may be formed from the system 10. The C2 system 10' includes domain-dependent reasoning agents 336a, 336b customized to a domain to answer domain-specific queries. The C2 system 10' also includes an ontology model 350 similar to the ontology model 50 but including specific domain instances 352. For example, the ontology model 350 is a database and the specific instances are placed in the fields of the database. In another example, the ontology model 350 is implemented in OWL and populated with domain-specific instances.

Figure 7:
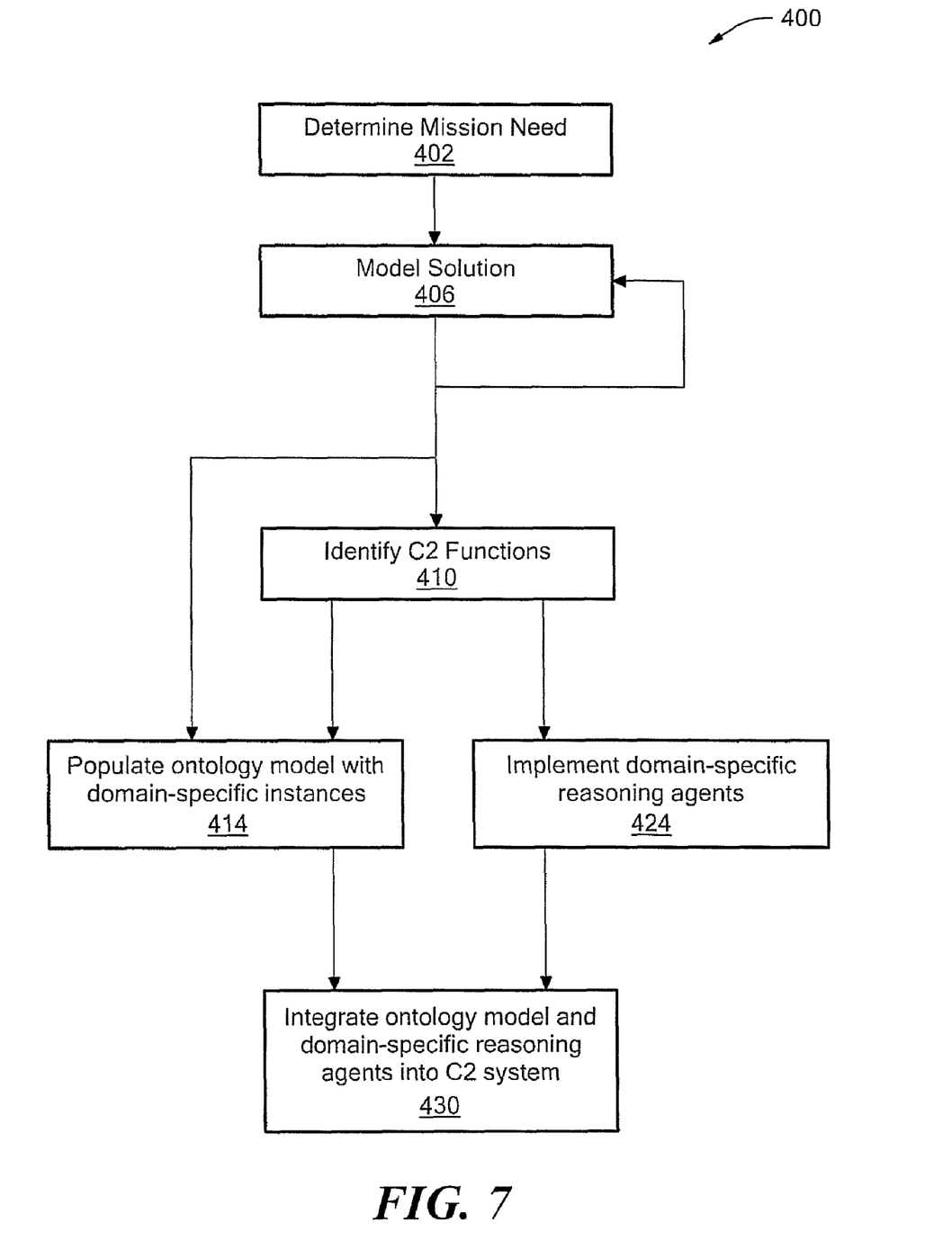
FIG. 7 is a flowchart of a process to generate a C2 system for a domain from the c2 system of claim 1.

Referring to FIG. 7, the domain-independent architecture in system 10 may be tailored to a specific domain using a process 400, for example. Requirements to accomplish a mission are determined (402) and a mission solution is modeled (406). For example, in a military domain the mission may include blowing up a bridge or in a disaster recovery domain the mission may include removing a chemical spill and protecting the population. The mission and the mission solution may be determined from techniques described in application Ser. No. 11/265,802 entitled "MISSION PROFILING" and application Ser. No. 11/392,222 entitled "ADAPTIVE MISSION PROFILING," each of these two patent applications are incorporated herein in their entirety and each are also assigned to the same entity as this patent application. In one example, an analyzable mission model is generated identifying the actors in the mission, what action the actors perform in the mission, when the actors perform the actions, why the actors perform the actions and how the actors perform the actions.

The command and control (C2) functions are determined (410). The steps in the mission model that requires decisions are identified and isolated. From the mission model, the information that is necessary to make a decision is identified and the knowledge that will support those decisions is identified.

The ontology model 50 is populated with domain-specific instances 352 to form the ontology model 350 (414). For example, each of the sixteen concepts 52a-52d, 54a-54d, 56a-56d, 58a-58d (in FIG. 3) is populated in the ontology model 50' with domain specific data on who makes what decision, when and how. For example, in a disaster recovery domain, the organizations such as the police department, the fire department and a hazardous materials team are included in the organization concept of the ontology model 50'. Specifically, concepts 52a-52d, 54a-54d, 56a-56d, 58a-58d are tailored to the domain (for example, policeman and firefighters are actors in the actor concept 54c).

The domain-specific reasoning agents 336a, 336b are implemented (424). For example, the domain-dependent reasoning agents 336a, 336b are designed to generate the necessary knowledge and prompt the resource agents 26a, 26b appropriately. For example, a domain-dependent reasoning agent 336a, 336b to track victim status in an environmental disaster would function differently from a domain-dependent reasoning agent for tracking victims in a health epidemic. The ontology model 50 and the domain-specific reasoning agents 336a, 336b are integrated in a C2 system to form a domain-specific C2 system 10' (430).

Figure 8:
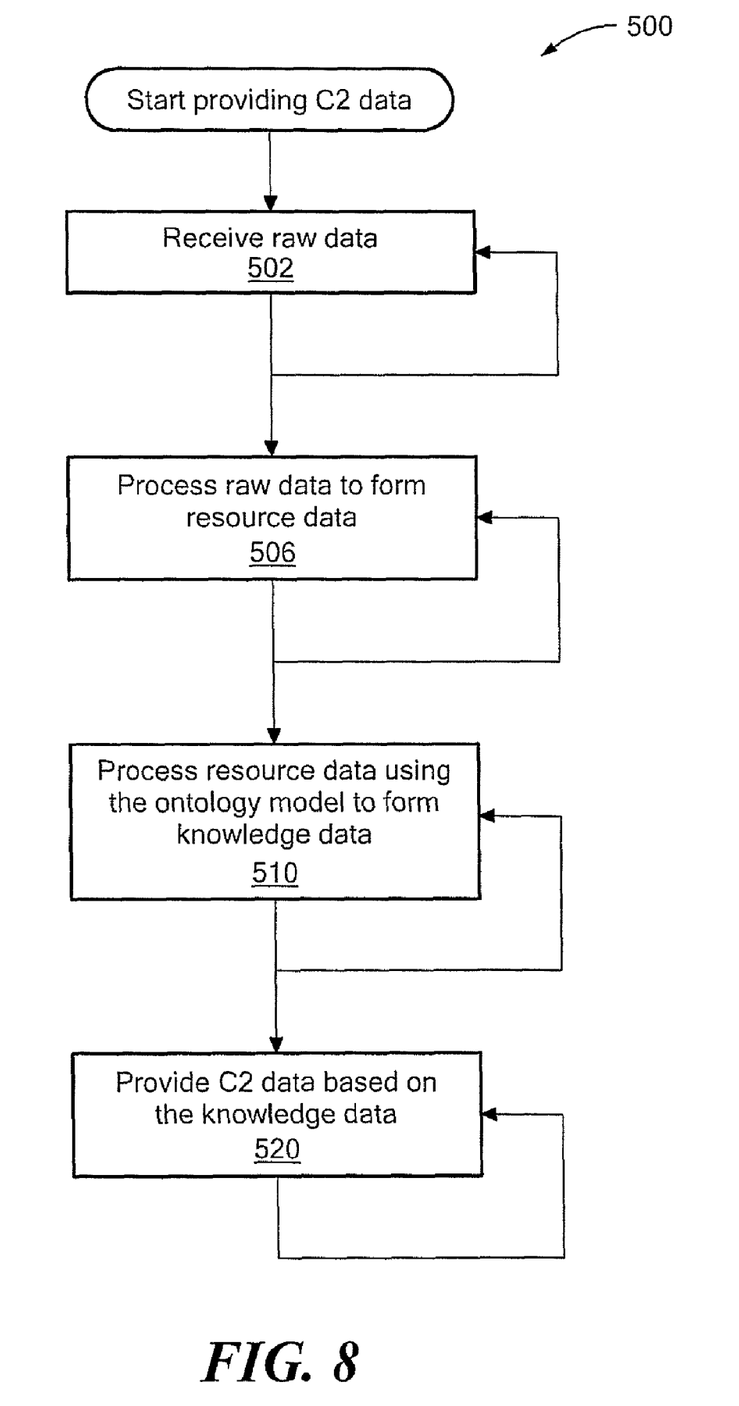
FIG. 8 is a flowchart of a process to provide C2.

Referring to FIG. 8, an example of a process to provide C2 support for a domain is a process 500. Raw data is received (502) and is processed to form resources data (506). For example, raw data 42 is received from the clients 12a, 12b and the resource agents 26a, 26b process the raw data 42 to provide resource data 44.

The resource data is processed (510). For example, resource data 44 is processed using the ontology model 350 including the domain-specific instances 352 to provide the knowledge data 42. For example, the domain-independent reasoning agents 36a, 36b and the domain-dependent reasoning agents 336a, 336b using the knowledge data 42 provide C2 data 48 based on queries. In one example, the client 12a may be a decision-maker that make queries for which the reasoning agents 36a, 36b, 336a, 336b solve the queries. In one example, each of the processing blocks 502, 506, 510 and 520 are performed continuously, spontaneously, as required or any combination thereof.

Figure 9:
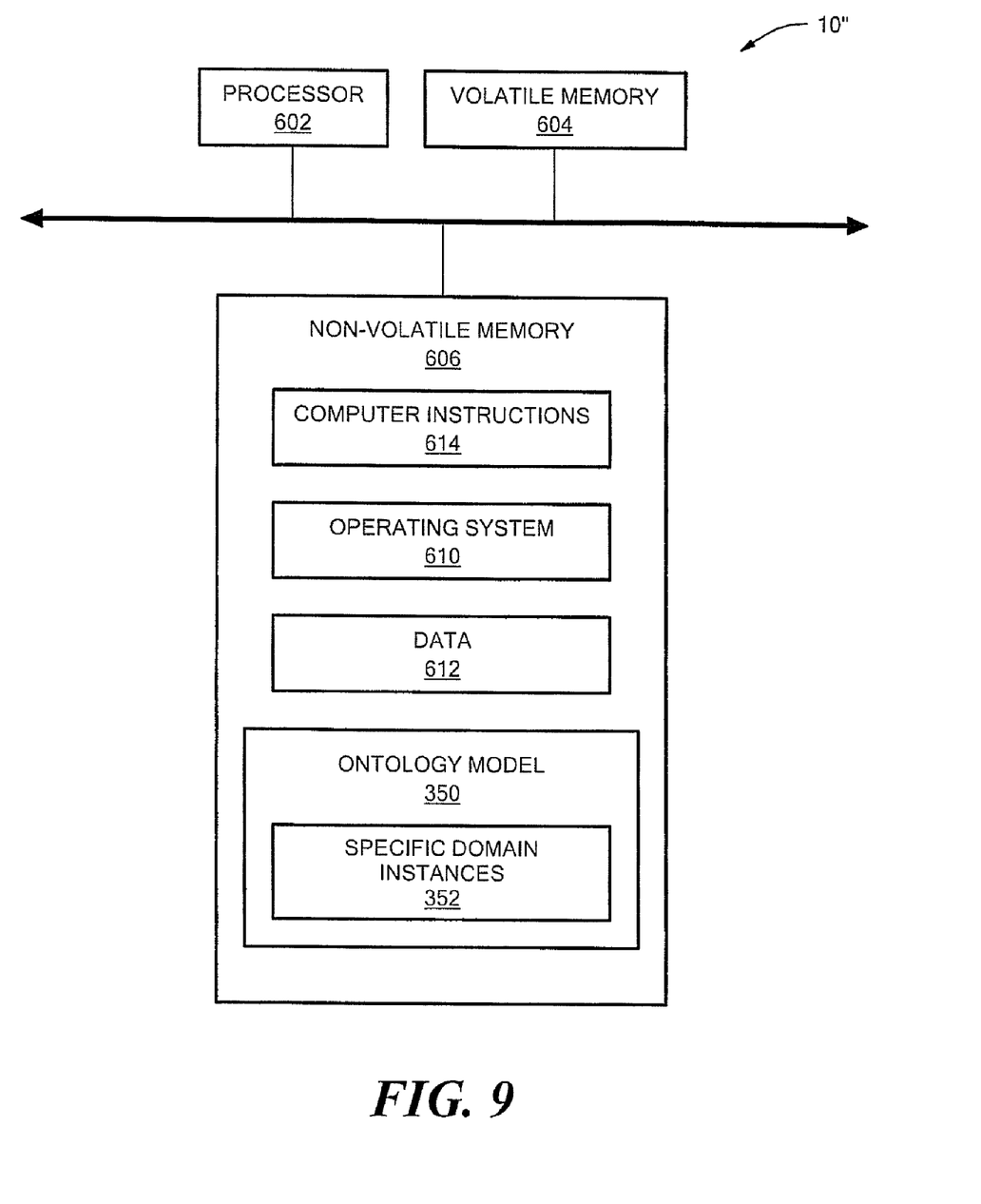
FIG. 9 is a block diagram of an example of a computer on which the process of FIG. 8 may be implemented.

Referring to FIG. 9, all or part of the C2 system 10' may be configured as a C2 processing system 10", for example. The C2 system 10" includes a processor 602, a volatile memory 604 and a non-volatile memory 606 (e.g., hard disk). The non-volatile memory 626 stores computer instructions 614, an operating system 610 and data 612. In one example, the computer instructions 614 are executed by the processor 602 out of volatile memory 604 to perform the process 500.

Process 500 is not limited to use with the hardware and software of FIG. 9; it may find applicability in any computing or processing environment and with any type of machine or set of machines that is capable of running a computer program. Process 500 may be implemented in hardware, software, or a combination of the two. Process 500 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 500 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 500. Process 500 may also be implemented as a machine-readable storage medium, configured with a computer program, where upon execution, instructions in the computer program cause the computer to operate in accordance with process 500.

The processes described herein are not limited to the specific embodiments described. For example, the process 500 is not limited to the specific processing order of FIG. 8, respectively. Rather, any of the processing blocks of FIG. 8 may be re-ordered, combined or removed, performed in parallel or in serial, as necessary, to achieve the results set forth above.

The processing blocks in FIG. 8 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A command and control (C2) system comprising:
a domain-independent architecture comprising an ontology model comprising:
a resource aspect configured to receive entities specific to a domain;
a responsibility aspect configured to receive actions specific to the domain and performed by the entities;
a rule aspect configured to receive rules specific to the domain and associated with the actions; and
a result aspect configured to receive effects specific to the domain and associated with the actions.

2. The C2 system of claim 1 wherein each of the aspects comprises at least four levels of abstraction to form at least sixteen concepts and each of the at least four levels of abstraction comprises a number of concepts corresponding to a number of aspects,
wherein each of the concepts comprises at least one relationship with another concept.

3. The C2 system of claim 2 wherein the at least one relationship with another concept comprises at least one relationship with another concept in the same level of abstraction.

4. The C2 system of claim 2 wherein the at least one relationship with another concept comprises at least one relationship with at least one concept in the same aspect.

5. The C2 system of claim 1, further comprising a knowledge agent configured to receive data and configured to provide knowledge data based on the ontology model to generate situational knowledge of a mission using the resource aspect, the rule aspect, the result aspect and the responsibility aspect.

6. The C2 system of claim 5, further comprising a resource agent configured to provide resource data to the knowledge agent.

7. The C2 system of claim 6 wherein the knowledge agent provides the knowledge data to a corresponding resource agent.

8. The C2 system of claim 6, further comprising a domain-independent reasoning agent configured to receive the knowledge data from the knowledge agent.

9. The C2 system of claim 8 wherein the domain-independent reasoning agent is configured to process the knowledge data generated by the knowledge agent to provide C2 data to answer C2 queries.

10. The C2 system of claim 1 wherein the domain is from a group of domains consisting of a military domain, a disaster preparedness domain, a disaster response domain and a corporate business domain.

11. The C2 system of claim 1 wherein the ontology model is populated with domain-specific instances; and
further comprising a domain-dependent reasoning agent associated with the domain configuring to customize C2 data provided by a domain-independent reasoning agent using the domain-specific instances.

12. The C2 system of claim 1 wherein the ontology model is represented in the Web Ontology Language (OWL).

13. The C2 system of claim 1 wherein the ontology model is represented in a database.

14. A command and control (C2) system comprising:
a domain-independent architecture comprising an ontology model comprising:
a resource aspect configured to receive entities specific to a domain;
a responsibility aspect configured to receive actions specific to the domain and performed by the entities;
a rule aspect configured to receive rules specific to the domain and associated with the actions; and
a result aspect configured to receive effects specific to the domain and associated with the actions;
wherein each of the aspects comprises at least four levels of abstraction to form at least sixteen concepts and each of the at least four levels of abstraction comprises a number of concepts corresponding to a number of aspects,
wherein each of the concepts comprises at least one relationship with another concept,
wherein the at least one relationship with another concept comprises:
at least one relationship with another concept in the same level of abstraction; and
at least one relationship with at least one concept in the same aspect.

15. The C2 system of claim 14, further comprising:
a knowledge agent configured to receive resource data and configured to provide knowledge data based on the ontology model to generate situational knowledge of a mission using the resource aspect, the rule aspect, the result aspect and the responsibility aspect;
a resource agent configured to provide the resource data to the knowledge agent;
a domain-independent reasoning agent configured to process the knowledge data from the knowledge agent to provide C2 data to answer C2 queries.

16. The C2 system of claim 15 wherein the domain is from a group of domains consisting of a military domain, a disaster preparedness domain, a disaster response domain and a corporate business domain.

17. The C2 system of claim 16 wherein the ontology model is populated with domain-specific instances; and
further comprising a domain-dependent reasoning agent associated with the domain configuring to customize C2 data provided by a domain-independent reasoning agent using the domain-specific instances.

18. The C2 system of claim 17 wherein the ontology model is represented in the Web Ontology Language (OWL).

19. A method of forming a command and control (C2) system, the method comprising:
providing a domain-independent architecture comprising an ontology model comprising:
providing a resource aspect configured to receive entities specific to a domain;
providing a responsibility aspect configured to receive actions specific to the domain and performed by the entities;
providing a rule aspect configured to receive rules specific to the domain and associated with the actions;
providing a result aspect configured to receive effects specific to the domain and associated with the actions;
wherein each of the aspects includes at least four levels of abstraction to form at least sixteen concepts and each of the at least four levels of abstraction comprises a number of concepts corresponding to a number of aspects,
wherein each of the concepts comprises at least one relationship with another concept,
wherein the at least one relationship with another concept comprises:
at least one relationship with another concept in the same level of abstraction; and
at least one relationship with at least one concept in the same aspect.

20. The method of claim 19, further comprising:
configuring a knowledge agent to receive resource data and configured to provide knowledge data based on the ontology model to generate a situational knowledge of a mission using the resource aspect, the rule aspect, the result aspect and the responsibility aspect;
configuring a resource agent to provide the resource data to the knowledge agent; and
configuring a domain-independent reasoning agent to process the knowledge data from the knowledge agent to provide C2 data to answer C2 queries.

21. The method of claim 20, further comprising:
populating the ontology model with domain-specific instances; and
configuring a domain-dependent reasoning agent associated with the domain to customize the C2 data provided by the domain-independent reasoning agent using the domain-specific instances in the ontology model,
wherein the domain is from a group of domains consisting of a military domain, a disaster preparedness domain, a disaster response domain and a corporate business domain.

* * * * *